Feb. 25, 1936.                H. B. CRAWFORD                2,031,820
                              DISPENSING DEVICE
                              Filed Jan. 12, 1935
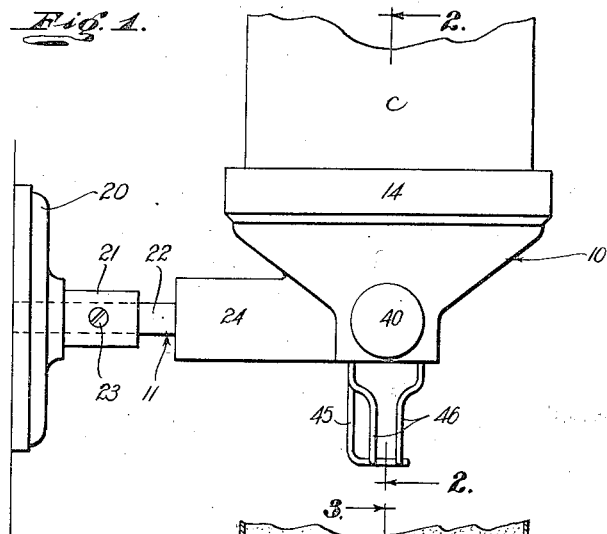
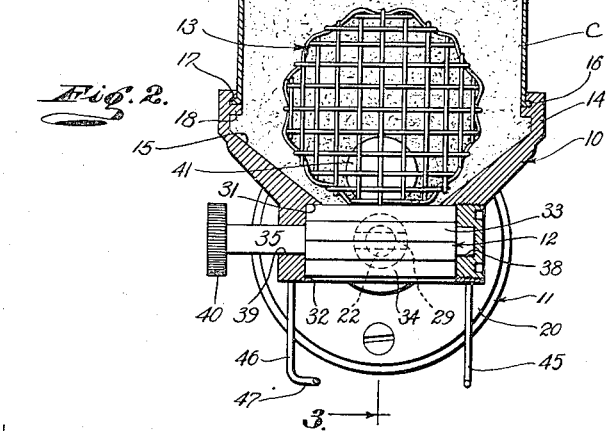
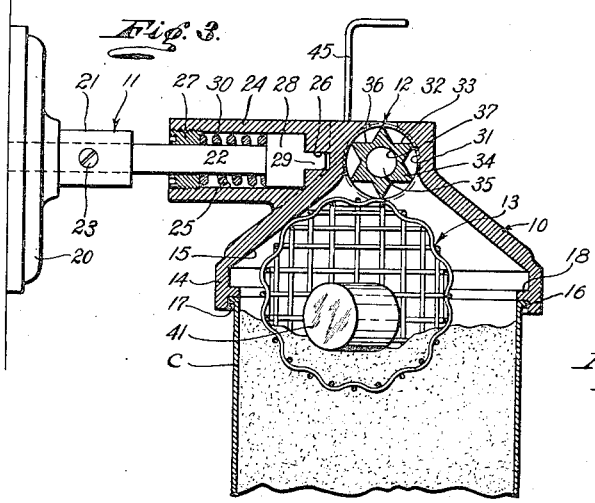
Inventor
Harvey B. Crawford
By
His Attorney Patented Feb. 25, 1936

2,031,820

UNITED STATES PATENT OFFICE 2,031,820

DISPENSING DEVICE

Harvey B. Crawford, La Canada Township, Los Angeles County, Calif.

Application January 12, 1935, Serial No. 1,530

8 Claims. (Cl. 221—106)

This invention has reference to a dispensing device and has particular reference to a device for measuring and dispensing comminuted and granular substances such as tooth powder and the like. A general object of the invention is to provide a simple, practical and effective device for measuring and dispensing tooth powder, etc.

Tooth powders and similar substances are commonly marketed in containers having relatively small discharge openings from which the material is poured. Most powders and substances of the character referred to soon cake or harden in the containers often making it necessary to jar or repeatedly shake the containers before the desired quantity of substance or powder may be obtained. This jarring and shaking of the containers usually causes great waste of the powder, especially in the case of tooth powder which is sprinkled on the comparatively small surface or area presented by the bristles of a tooth brush.

Another object of the invention is to provide a practical dispensing device that is operable to discharge or dispense the required amount of powder or substance by merely turning a convenient knob or handle.

Another object of the invention is to provide a device for dispensing tooth powder and the like that keeps the powder in a sanitary condition and protects it against contamination and excessive contact with the atmosphere.

Another object of the invention is to provide a dispensing device of the character mentioned that includes a novel effective agitator that insures the free flow and discharge of the powder.

Another object of the invention is to provide a device for dispensing tooth powder and the like in which the material or powder may be held or contained in the original container in which it was marketed.

Another object of the invention is to provide a dispensing device of the character mentioned in which the container holding the powder may be easily and conveniently mounted on the device without inverting the container so that there is no danger of spilling or losing the powder.

A further object of the invention is to provide a dispensing device of the character mentioned that is simple and inexpensive and that is capable of embodiment in a neat, sightly and attractive fixture for installation in bathrooms, etc.

The various objects and features of my invention will be fully understood from the following detailed description of a typical preferred form and application of the invention, throughout which description reference is made to the accompanying drawing, in which:

Fig. 1 is a side elevation of the device provided by this invention. Fig. 2 is a vertical detailed sectional view taken as indicated by line 2—2 on Fig. 1 and Fig. 3 is a vertical detailed sectional view taken as indicated by line 3—3 on Fig. 2 illustrating the body in the inverted position.

The dispensing device of the present invention includes, generally, a body 10 for carrying the container C of powder, means 11 for mounting or securing the body 10 on a support, valve means 12 for measuring and dispensing the powder from the body 10, and an agitator 13 for insuring the free proper discharge of the powder from the valve means 12.

The body 10 is provided to support or carry the container C. In practice the body 10 may be a simple one piece or integral member as illustrated in the drawing and may be finished or plated as found desirable. The major portion of the body 10 is substantially frusto-conical in its external configuration having a downwardly and inwardly tapering surface. In the particular structure illustrated in the drawing a substantially cylindrical flange 14 is provided on the upper end of the body 10 to receive and carry the end portion of the container C. The lower end of the body 10 is preferably flat and substantially horizontal. The body 10 is chambered or socketed having a central recess or socket 15 in its upper side. The socket 15 is open at the upper end of the body 10 to receive the powder from the container C. The wall of the socket 15 is preferably inclined downwardly and inwardly to facilitate the free movement or passage of the powder to the valve means 12.

Means is provided on the body 10 for facilitating the connection of the container C with the body. In accordance with the broader aspects of the invention any suitable or desirable means may be provided for connecting the receptacle or container C with the body, it being apparent that the character of this means depends to a large extent upon the type of container to be arranged on the body. In the drawing I have illustrated a metal container C having spaced projections or lugs 16 at its upper edge and have shown the interior of the flange 14 designed to receive the upper edge portion of the container C when the container is in an inverted position. Spaced bayonet type notches or slots 17 are provided in the inner side of the flange 14 to receive the lugs 16. An inwardly projecting annular bead 18 is provided at the inner ends of the slots 17 to be engaged by the edge or end of the container C. When the lugs 16 are properly engaged in the slots 17 the substance or powder from the container C freely empties into the socket 15.

The means 11 for mounting or securing the body 10 to a support is such that the body may be easily attached to a wall or similar support and it is a feature of the invention that the means 11 is such that the body 10 may be readily inverted as shown in Fig. 3 of the drawing to permit the easy attachment of the container C to the body. The mounting or securing means 11 includes a mounting bracket or plate 20. The plate 20 may be substantially disc shaped and may be secured to the wall or support in any suitable manner. A substantially cylindrical tubular boss 21 projects horizontally from the center of the plate 20. A stem 22 has its end portion shiftably or slidably received in the opening of the boss 21. The stem 22 may be adjusted longitudinally in the boss 21 to project various distances and may be locked in the adjusted position by a set screw 23. The stem 22 has non-rotative engagement with the boss 21 and cannot turn or rotate. A laterally or horizontally projecting boss 24 is provided on the lower end portion of the body 10. The boss 24 projects rearwardly to oppose the boss 21 of the mounting plate 20. An opening 25 extends into the boss 24 and has a flat sided slot 26 in its inner end wall. The opening 25 receives the projecting outer end portion of the stem 22. A tubular plug or bearing 27 is threaded in the outer end portion of the opening 25 to slidably pass or engage the stem 22. A head 28 is provided on the outer end of the stem 22 and has sliding and bearing engagement with the wall of the opening 25. The means 11 includes a flat sided key 29 on the head 28 adapted to cooperate with the slot 26 to normally hold the body 10 against turning on the stem 22. The key 29 and the slot 26 are related so that the socket 15 faces upwardly when the slot 26 receives the key 29 and the body 10 is in its normal position illustrated in Figs. 1 and 2 of the drawing.

Upon shifting of the body 10 outwardly on the stem 22 the slot 26 may be disengaged from the key 29 and the body may be turned for approximately 180° to the inverted position illustrated in Fig. 3 of the drawing whereupon the slot 26 may again receive the key 29. A spring 30 is arranged in the opening 25 under compression between the bearing 27 and the head 28 to normally hold the body 10 in the position where its slot 26 receives the key 29. When it is desired to attach a container C to the body 10 the body is moved outwardly on the stem 22 against the action of the spring 30 to free the slot 26 from the key 29 and is turned to the inverted position where its socket 15 faces downwardly. With the body 10 in this inverted position the lugs 16 on the upper end of the container may be readily entered in the slots 17 to properly attach the container to the body without the necessity of inverting the container. Following the attachment of the container C to the body 10 the body may again be moved outwardly on the stem 22 to disengage the slot 26 from the key 29 and then turned to the upright position. The spring 30 tends to automatically return the body to the position where the slot 26 receives the key 29 when the body assumes its proper upright position.

The valve means 12 is provided to discharge or dispense the powder from the lower end of the body 10. The valve means 12 provides an opening 31 in the lower end portion of the body 10. The opening 31 is preferably cylindrical and extends horizontally at right angles to the opening 25. The upper end of the opening 31 has extensive communication with the socket 15, that is the lower end of the downwardly convergent socket 15 opens into the opening 31. A discharge port 32 extends from the opening 31 to the lower end of the body 10. The port 32 may be of substantial length and may be in the form of a slot. When the device is intended to handle tooth powder the port 32 may be approximately as long as the tufted portion of the average tooth brush.

The valve means 12 includes a valve 33 rotatable in the opening 31. The valve 33 is an elongate member of substantially star-shaped transverse cross section having a multiplicity of circumferentially spaced axial grooves 36. The grooves 36 may be substantially V-shaped leaving or providing a plurality of spaced blades or vanes 34. The outer edges of the vanes 34 may have sliding contact with the wall of the opening 31. An operating stem 35 is connected with the valve 33. In the construction illustrated in the drawing the stem 35 is pressed or force-fitted in a longitudinal opening 37 in the valve 33 and projects from the opposite ends of the valve. One end portion of the stem 35 is rotatably carried by a socketed plug 38 in one end of the opening 31. The other end portion of the stem 35 extends through an opening 39 in the body and projects from a side of the body. A suitable operating handle or knob 40 is provided on the projecting end portion of the valve stem 35. It is believed that it will be apparent how rotation or turning of the valve stem 35 successively brings the grooves 36 into registration with the port 32 to discharge or dispense measured quantities of the powder from the port.

The agitator 13 is provided to agitate the material or powder in the socket 15 and the lower portion of the inverted container C to insure the proper free delivery of the powder from the port 32 when the valve 33 is operated. In accordance with the invention the agitator 13 is actuated by the valve 33 and is entirely automatic in its operation. The agitator 13 is a perforate hollow member. In practice the agitator 13 may be formed of screen or wire mesh of a suitable gauge. The agitator 13 is preferably substantially spherical so that it may readily roll and rotate. A weight member 41 is provided within the agitator 13 to prevent the agitator from rising into the powder or material in the container C. The weight member 41 also constitutes an agitator within the agitator 13 to prevent the powder from caking in the agitator 13. The agitator 13 is free or unsecured and remains in the socket 15 so that it rests on the upper vanes 34 of the valve 33. Where I refer to the agitator as unsecured I mean that it is free to move about at will through the action of the valve 33 even though it may be confined to remain in a particular zone by the walls of the socket 15 etc. When the valve 33 is turned its vanes 34 engage the agitator 13 to turn and shift the agitator about to effectively agitate the powder. The downwardly and inwardly inclined walls of the socket 15 guide or direct the agitator into engagement with the valve 33.

When the dispensing device is designed or intended to dispense tooth powder the invention includes means for positioning or locating tooth brushes below the port 32. The means for locating the tooth brushes to receive powder from the port 32 includes a substantially L-shaped stop 45 projecting downwardly from the lower end of the body 10 adjacent one end of the port 32. Two spaced arms 46 project downwardly from the body adjacent the other end of the port 32 and are connected at their lower ends by a horizontally projecting U-shaped connector 47. The connector 47 and the lateral finger at the lower end of the stop 45 are in the same horizontal plane. The arms 46 are adapted to be engaged by an end of a tooth brush while the connector 47 and the stop 45 are adapted to cooperate with the lower side and an edge of the brush to properly center or locate the brush below the port 32.

It is believed that the utility and practicality of the invention will be readily apparent from the foregoing detailed description. As described above, the body 10 may be readily turned to the inverted position illustrated in Fig. 3 of the drawing in order to attach a container C to the body without inverting the filled container. The agitator is placed on the material in the container to assume its proper position in the socket 15. After the attachment of the container to the body 10 the body is, of course, returned to its upright normal position where the key 29 cooperates with the slot 26 to hold the body against undesirable turning. The body is positively held against inward movement on the stem 22 by the engagement of the head 28 with the inner end of the opening 25. The stop 45 and the arms 46 with their connector 47 are adapted to properly locate the tufted portion of a tooth brush below the elongated discharge port 32. Upon turning of the knob 40 one or more grooves 36 of the valve 33 are brought into communication with the port 32 to discharge measured quantities of the powder from the opening 32. It will be apparent that the user may obtain any desired or required amount of powder by suitably turning the knob 40. The port 32 is proportioned so that little or none of the powder is lost or spilled from the brush. The agitator 13 normally rests on the upper vanes 34 of the valve and upon turning of the valve the vanes turn the agitator and move the agitator about in the socket 15. This turning and movement of the agitator effectively loosens and agitates the powder and prevents the formation of lumps. The dispensing device of the present invention is particularly easy and convenient to use and is compact and attractive.

Having described only a typical preferred form and application of my invention, I do not wish to be limited or restricted to the specific form and application herein set forth, but wish to reserve to myself any modifications or variations that may appear to those skilled in the art or fall within the scope of the following claims.

Having described my invention, I claim:

1. A device for dispensing material from a container including a body for carrying the container, a valve for discharging the material from the body, and an unsecured hollow perforate agitator resting on the valve to be moved about by actuation thereof to agitate said material for free flow through the valve.

2. A device for dispensing material from a container including a body for carrying the container, a valve for discharging the material from the body, an unsecured hollow perforate agitator resting on the valve to be moved by actuation thereof to maintain the material free for passage through the valve, and a free weight movable about in the agitator as the loose agitator moves.

3. A device for dispensing tooth powder and like materials including a body for carrying a container of the material, the body having a port for discharge of the material, a rotatable valve for controlling the port and comprising projecting vanes, and means for agitating the material including an unsecured agitator engaged and moved about by the vanes of the valve.

4. A device for dispensing tooth powder and like materials including a body for carrying a container of the material, the body having a port for the discharge of the material, a rotatable valve for controlling the port and comprising projecting vanes, and means for agitating the material including an unsecured substantially spherical perforate agitator turned and shifted about by the vanes of the valve when the valve is turned.

5. A device for dispensing tooth powder and like materials including a body for carrying a container of the material, the body having a port for the discharge of the material, a rotatable valve for controlling the port and comprising projecting vanes, and means for agitating the material including a hollow mesh agitator moved about by the vanes of the valve, and a loose weight in the agitator.

6. A device for dispensing powder and like material including a body having an opening with downwardly convergent walls, and a port at the lower end of the opening, a rotatable valve for controlling the port and having projecting vanes, and a loose unsecured agitator in the opening adapted to be engaged and moved about freely by the vanes of the valve as it rotates to loosen and agitate the powder for passage through the valve.

7. A device for dispensing powder and like material including a body having an opening with downwardly convergent walls, and a port at the lower end of the opening, means for supporting a container on the body to have its contents pass into the opening, a valve for controlling the port and having projecting parts, and a loose unattached agitator in the opening freely turned and moved about in the opening by engagement with said parts when the valve is operated to loosen and agitate the powder in the opening.

8. A device for dispensing powder and like material including a body having an opening with downwardly convergent walls, and a port at the lower end of the opening, means for supporting an inverted container on the body to discharge into the opening, a valve for controlling the port, a loose unattached perforate agitator in the opening turned and moved about by the valve to loosen and agitate the powder for passage through the valve, and means for mounting the body on the support for movement between a position where the opening faces upwardly and a position where the opening faces downwardly.

HARVEY B. CRAWFORD.